United States Patent
Chen et al.

(10) Patent No.: US 11,040,667 B2
(45) Date of Patent: Jun. 22, 2021

(54) ROOF LUGGAGE RACK AND ARTICLE SEPARATION DEVICE

(71) Applicant: WINBO-DONGJIAN AUTOMOTIVE TECHNOLOGY CO., LTD., Foshan (CN)

(72) Inventors: Yongbo Chen, Foshan (CN); Zhihai Zhang, Foshan (CN); Wei Hu, Foshan (CN); Jie Yang, Foshan (CN)

(73) Assignee: WINBO-DONGJIAN AUTOMOTIVE TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 16/568,300

(22) Filed: Sep. 12, 2019

(65) Prior Publication Data
US 2020/0001797 A1    Jan. 2, 2020

Related U.S. Application Data

(63) Continuation of application No. PCT/CN2018/074106, filed on Jan. 25, 2018.

(51) Int. Cl.
*B60R 9/00* (2006.01)
*B60R 9/045* (2006.01)

(52) U.S. Cl.
CPC ................... *B60R 9/045* (2013.01)

(58) Field of Classification Search
CPC ..................................................... B60R 9/045
USPC ....................................................... 224/309
See application file for complete search history.

(56) References Cited

U.S. PATENT DOCUMENTS

| | | | | |
|---|---|---|---|---|
| 4,278,376 A | * | 7/1981 | Hunter | B60P 7/14 410/104 |
| 4,500,020 A | * | 2/1985 | Rasor | B60R 9/045 224/321 |
| 4,717,298 A | * | 1/1988 | Bott | B60P 7/0892 403/326 |
| 5,035,184 A | * | 7/1991 | Bott | B60P 7/135 104/121 |
| 5,161,700 A | * | 11/1992 | Stannis | B60R 7/02 211/175 |
| 5,167,479 A | * | 12/1992 | Bott | B01D 53/485 224/42.33 |
| 5,715,978 A | * | 2/1998 | Ackeret | B60P 7/0815 224/42.33 |

(Continued)

FOREIGN PATENT DOCUMENTS

| | | |
|---|---|---|
| CN | 201405797 Y | 2/2010 |
| CN | 202574026 U | 12/2012 |

(Continued)

*Primary Examiner* — Peter N Helvey

(57) ABSTRACT

The present disclosure provides a roof luggage rack and an article separation device. When used as the roof luggage rack, the device may include a cross rod assembly to carry articles; a longitudinal rod to fix on a vehicle roof; a locking buckle, which has two ends respectively buckling with the cross rod assembly and the longitudinal rod in a detachable manner, such that the cross rod assembly and the longitudinal rod may be fixed in a detachable manner. The roof luggage rack and the article separation device may be combined and connected by different means to achieve various purposes, overcoming a problem of the device having a single usage purpose.

8 Claims, 12 Drawing Sheets

(56) References Cited

U.S. PATENT DOCUMENTS

| | | | | |
|---|---|---|---|---|
| 6,524,043 B2* | 2/2003 | Earle | ................. | B60P 7/14 410/121 |
| 6,846,140 B2* | 1/2005 | Anderson | ............ | B60P 7/0815 410/102 |
| 6,974,170 B2* | 12/2005 | Mulvihill | .............. | B60P 7/0892 224/42.33 |
| 7,028,872 B2* | 4/2006 | Lobanoff | ................. | B60R 5/047 211/123 |
| 7,214,018 B2* | 5/2007 | Lussier | .................... | B60P 7/14 410/130 |
| 8,360,494 B2* | 1/2013 | Quiros Perez | .......... | B60R 5/048 296/24.4 |
| 8,974,157 B2* | 3/2015 | Jones | ....................... | B60R 5/04 410/34 |
| 9,016,764 B2* | 4/2015 | Johnson | ............... | B62D 33/023 296/183.1 |
| 2002/0048495 A1* | 4/2002 | Anderson | ............. | B60P 7/0815 410/104 |
| 2003/0082023 A1* | 5/2003 | Bernardo | .................. | B60P 7/14 410/129 |
| 2003/0184107 A1* | 10/2003 | Hapspel | .................... | B60R 5/04 296/24.4 |
| 2004/0056058 A1* | 3/2004 | Ryan | ......................... | B60R 7/02 224/498 |
| 2008/0101885 A1* | 5/2008 | Kmita | ....................... | B60P 7/14 410/130 |
| 2015/0298618 A1 | 10/2015 | Edward et al. | | |

FOREIGN PATENT DOCUMENTS

| | | |
|---|---|---|
| CN | 203739772 U | 7/2014 |
| CN | 106740520 A | 5/2017 |
| GB | 690148 A | 4/1953 |

\* cited by examiner

ROOF LUGGAGE RACK AND ARTICLE SEPARATION DEVICE

CROSS REFERENCE TO RELATED APPLICATIONS

The present application is a continuation-application of international (PCT) Patent Application No. PCT/CN2018/074106 filed on Jan. 25, 2018, which claims foreign priority of Chinese Patent Application No. 201710151222.7, in the title of "Object carrying device of car", filed on Mar. 14, 2017, in the National Intellectual Property Administration of China, the entire contents of which are hereby incorporated by reference in their entireties.

TECHNICAL FIELD

The present disclosure relates to the field of vehicle parts, and in particular to a roof luggage rack, which may also be used as an article separation device.

BACKGROUND

Vehicles may usually carry passengers, but also may carry articles. Vehicles usually use a trunk and a roof to carry the articles. Large sized articles may be carried on the roof, and some small sized articles may be carried in the trunk. After the vehicle released from the factory, the trunk of the vehicle may not be separated for placing articles. When placing articles into the trunk, especially when the articles is in a small quantity and fragmented, during running of the vehicle, the articles carried in the trunk may be scattered around, being damaged, and the trunk of the vehicle may look messy. Currently, it may be difficult to take out and place articles, the trunk may appear as untidy, and a device to fix articles effectively may not be available.

SUMMARY OF THE DISCLOSURE

The present disclosure may provide a device to carry and separate articles, which may prevent the articles from colliding and being damaged when placed in a trunk, and prevent the trunk from being messy. The device may be further used on a roof to effectively fix articles.

The present disclosure may provide a roof luggage rack, which may include a cross rod assembly to carry an article; a longitudinal rod, fixed on the roof; a locking buckle, two ends of the locking buckle detachably buckling with the cross rod assembly and the longitudinal rod, such that the cross rod assembly and the longitudinal rod may be fixed in a detachable manner.

The present disclosure may further provide an article separation device, which may include a bottom board to carry articles; at least two cross rod assemblies, engaged on the bottom board to separate the articles placed on the bottom board; a connection element, which may connect the cross rod assemblies and the bottom board in a detachable manner and may slide along the bottom board to adjust distance between two adjacent cross rod assemblies based on sizes of the articles; and a locking switch, which may be engaged with the connection element to lock the connection element tightly with the bottom board after the positions of the cross rod assemblies are adjusted properly.

The present disclosure may provide a device, which may be used to carry articles and separate the articles. When the device is used as a roof luggage rack, it may be arranged on a roof of a vehicle to carry large sized articles, which may not fit in the trunk. When the device is used as an article separation device, it may be used to separate small articles placed in the trunk. The device may use a connection element to connect the bottom board with at least two cross rod assemblies in a detachable manner, and positions of the cross rod assemblies may be adjusted flexibly according to sizes of the articles. After the adjustment, the device may further use a locking switch to fix the connection element to the bottom board to achieve the separation of the articles. When the cross rod assemblies are not required to separate the articles, the cross rod assemblies may be fixed on a side of the bottom board, which may not occupy any space to achieve easy storage. To summarize, it may be suggested that the device for carrying and separating articles provided by the present disclosure may be used to carry large sized articles on the roof of the vehicle, and may also used in the trunk of the vehicle to fix and separate small sized articles. Such that a technical problem of the conventional roof luggage rack with single purpose of usage in the related art may be solved.

BRIEF DESCRIPTION OF THE DRAWINGS

In order to further clearly demonstrate technical solutions provided by the present disclosure and technical solutions in the related art, figures for illustrating embodiments or related art will be described briefly. Obviously, figures in the following description illustrate only embodiments of the present disclosure. For ordinary skilled in the art, without creative endeavor, other figures may be obtained according to the provided figures.

DETAILED DESCRIPTION

The present disclosure may provide a roof luggage rack and an article separation device. The device may be used as the roof luggage rack and also used in a trunk to separate articles, which may solve the technical problem of the article carrying device in the related art with single purpose of usage.

Technical solutions of embodiments of the present disclosure will be described clearly and comprehensively. Obviously, described embodiments are only a part of, but not all of, the embodiments of the present disclosure. Based on the embodiments of the present disclosure, any other embodiments obtained by ordinary skilled in the art without any creative endeavor should be within the scope of the present disclosure.

In order to further describe the present disclosure in details, a roof luggage rack, which may also be used to separate articles, will be described in details by referring to embodiments.

When some large sized articles, which may not be able to fit within a trunk of a vehicle, need to be carried, the device may be arranged on a roof of the vehicle, used as a roof luggage rack to carry the articles.

Figure 1:
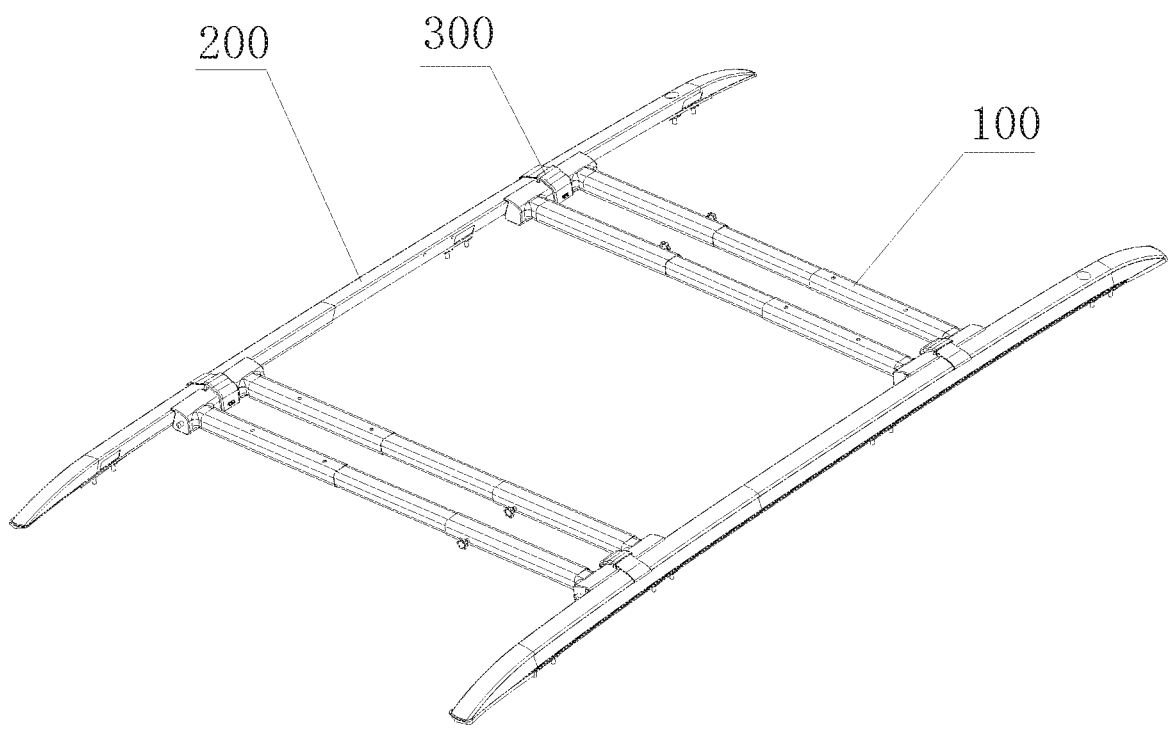
FIG. 1 is a perspective view of a roof luggage rack according to an embodiment of the present disclosure.
Figure 2:
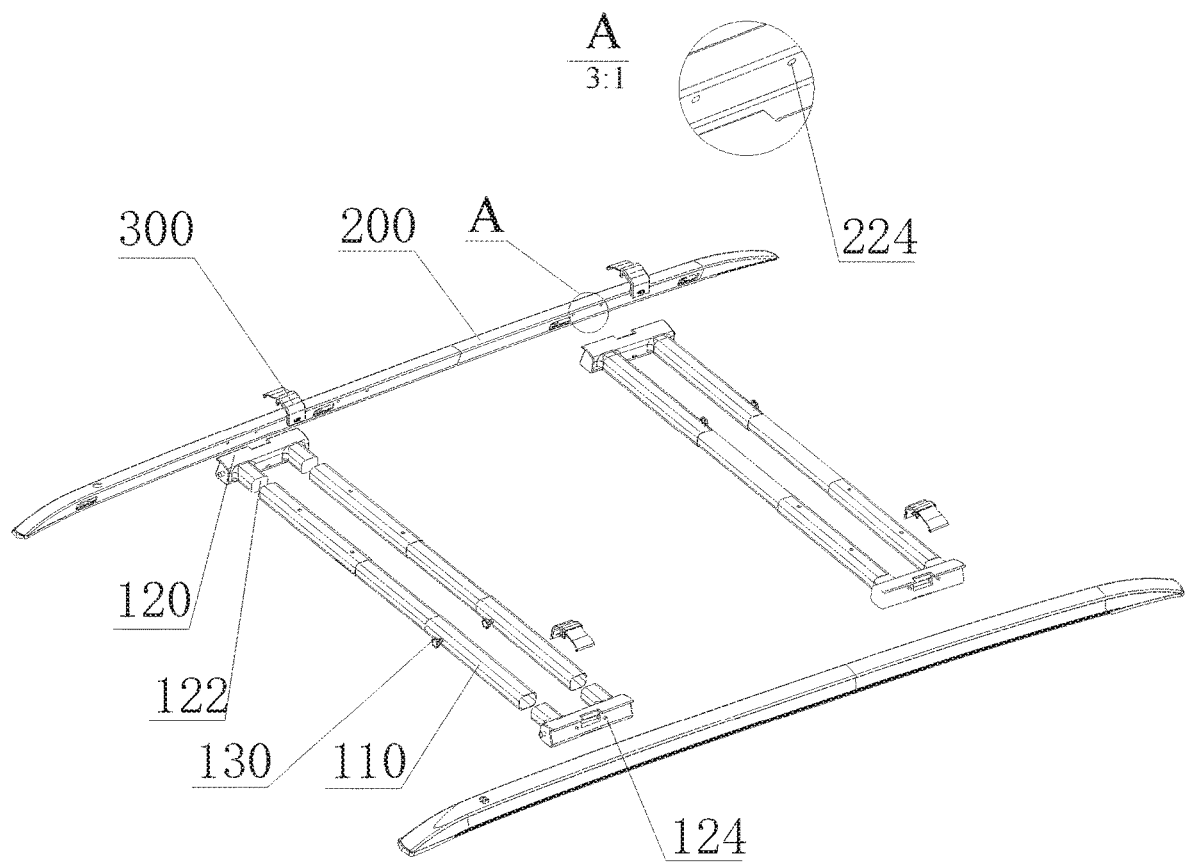
FIG. 2 is an exploded perspective view of the roof luggage rack according to FIG. 1.

Referring to FIG. 1 and FIG. 2, FIG. 1 is a perspective view of a roof luggage rack according to an embodiment of the present disclosure, and FIG. 2 is an exploded perspective view of the roof luggage rack according to FIG. 1.

The roof luggage rack may usually be arranged on the roof of the vehicle to carry large sized articles, which cannot fit within a trunk of the vehicle, such as large luggage, bicycles, or the like. For convenient transportation during travelling, various vehicle models may be able to assemble a roof luggage rack. Commonly, vehicles, such as off-roaders, mid-sized vehicles, buses and the like, may improve loading capacities by assembling roof luggage racks.

The roof luggage rack may include a cross rod assembly 100, a longitudinal rod 200, and a locking buckle 300. The cross rod assembly 100 may be used to carry articles; the longitudinal rod 200 may be fixed on the roof and used by engaging with the cross rod assembly 100; and two ends of the locking buckle 300 may respectively buckle with the cross rod assembly 100 and the longitudinal rod 200 in a detachable manner, such that the cross rod 100 and the longitudinal rod 200 may be fixed in a detachable manner.

The cross rod assembly 100 may include a cross rod main body 110 and cross rod connection portions 120. The cross rod connection portions 120 may be engaged with two ends of the cross rod main body 110 and connect with the longitudinal rod 200 and the locking buckle 300 in a detachable manner.

The cross rod assembly 100 may further include a fixing portion 130, and the cross rod main body 110 may include at least two hollow tubes, wherein the at least two hollow tubes may sleeve-connect with each other and be adjusted by extending and retracting flexibly, and the fixing portion 130 may be configured to fix the at least two hollow tubes. The hollow tubes may be rectangular, triangular, circular, or any regular shaped, and may also be trapezoid, star-shaped or any irregular shaped. The tubes may be made of aluminum, which may be in light weight, stainless steel, which may avoid getting rusty, or a metal alloy, which may be in light weight with higher strength and good rust resistance. The materials will not be limited herein, selection of the materials may be flexible according to actual situations. Practically, sizes of the roof luggage racks used for vehicles may be various, in order to allow the cross rod of the roof luggage rack to be suitable for various vehicle models, the length of the cross rod assembly 100 must be adjustable to fit with various sizes of different vehicle models. The number of the hollow tubes may be at least two, and may be three, four, or more. In the present embodiment, with the sleeve-connection of three hollow tubes and fixing by the fixing portion 130, adjusting the length of the cross rod 100 may be achieved.

Figure 3:
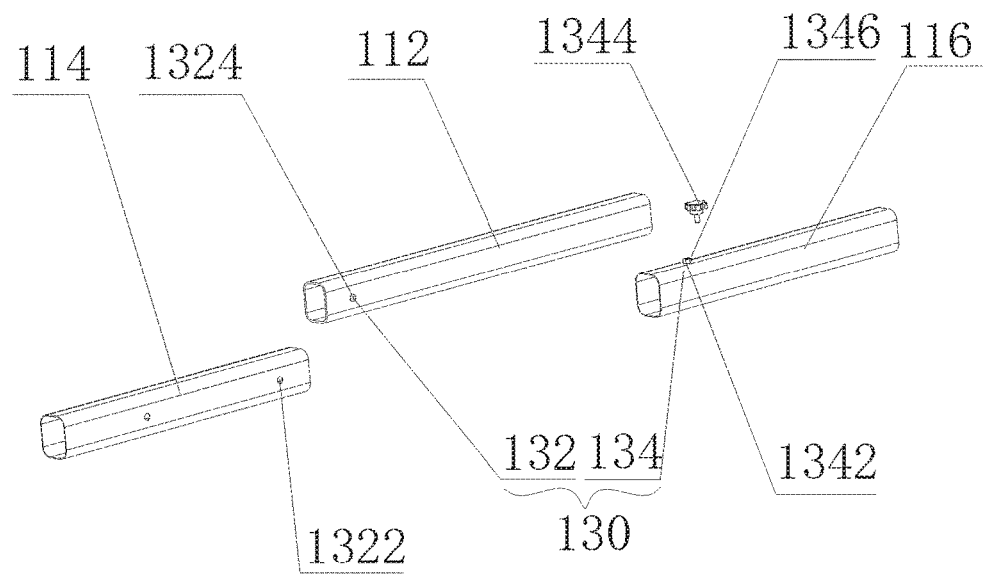
FIG. 3 is an exploded perspective view of a main body of the cross rod according to FIG. 2.

Referring to FIG. 3, which an exploded perspective view of a main body of the cross rod according to FIG. 2. An outer diameter of the middle hollow tube 112 of the three hollow tubes may be smaller than inner diameters of a first outer hollow tube 114 and a second outer hollow tube 116 of the three hollow tubes. Therefore, the middle hollow tube 112 may be encased within the first and the second outer hollow tubes 114 and 116. The fixing portion 130 may include a first fixing portion 132 to fix the middle hollow tube 112 with the first outer hollow tubes 114; and a second fixing portion 134 to fix the middle hollow tube 112 with the second outer hollow tube 116.

The first fixing portion 132 may include a positioning protrusion 1324, configured on the middle hollow tube 112, and at least one positioning hole 1322, defined on the first outer hollow tubes 114. When a plurality of the positioning holes 1322 are defined, the plurality of the positioning holes 1322 may be defined along a length direction of the first outer hollow tube 114. The positioning protrusion 1324 may be configured on the middle hollow tube 112 and can be elastically protruded. When the positioning protrusion 1324 is pressed, it may be received into the middle hollow tube 112, and when the pressing is away, the positioning protrusion 1324 may be protruded from a surface of the middle hollow tube 112 by an internal elastic force. An end configured with the positioning protrusion 1324 of the middle hollow tube 112 may be inserted into the first outer hollow tube 114 by pressing the positioning protrusion 1324 to allow the insertion of the middle hollow tube 112 into the first outer hollow tube 114. When the middle hollow tube 112 slides to reach the positioning hole 1322, the positioning protrusion 1324 may be protruded into the positioning hole 1322. The pressing may be moved away, and the positioning protrusion 1324 may be elastically protruded from the middle hollow tube 112 inserting into the positioning hole 1322 of the first outer h tube 114, such that the middle hollow tube 112 may be prevented from moving along the first outer hollow tube 114.

The second fixing portion 134 may include a screw hole 1342 defined on the other hollow tube 116 and a screw fastening apparatus 1344. Another end of the middle hollow tube 112, which is close to the second outer hollow tube 116, may be inserted into the second outer hollow tube 116, and the screw fastening apparatus 1344 may be screwed into the screw hole 1342 from outside of the second outer hollow tube 116, such that an end of the screw fastening apparatus 1344 may press against an outer surface of the middle hollow tube 112 to prevent the middle hollow tube 112 from sliding inside the second outer hollow tube 116. In the present embodiment, the screw fastening apparatus 1344 may be a Torx screw, and in other embodiments, the screw fastening apparatus 1344 may be a bold with a screw structure or other types of screws. Using the Torx screw 1344 is because this type of screw may have a great torque and may be fastened by applying a smaller force. Further, it is because the Torx screw may be fastened by bare hands with minimal usage of tools, reducing difficulties of configuration.

Further, to save materials and costs, the cross rod main body 110 may use hollow tubes with smaller thickness. As hollow tubes with reduced thickness may reduce connection strength of the screw hole, in order to guarantee the connection strength of the second fixing portion 134, in the present embodiment, a nut 1346 with a same diameter as the screw hole 1342 may be configured at outside of the hollow tube 116 along an axis of the screw hole 1342. The nut 1346 may be fixed onto the second outer hollow tube 116 by various means. In the present embodiment, the nut 1346 may be fixed on the outside of the second outer hollow tube 116 by welding.

While using the roof luggage rack, two hollow tubes 114 and 112, which have the positioning holes 1322 engaged with the positioning protrusion 1324, may be configured at first, because the positioning holes 1322 may be defined on the first outer hollow tube 114 with certain distance apart. Compared with the fastening structure generated by the screw hole 1342 and the screw fastening apparatus 1344, the engagement between the positioning hole 1322 and the positioning protrusion 1324 may not achieve arbitrary adjustment of the length of the cross rod assembly 100. Therefore, securing the positioning hole 1322 with the positioning protrusion 1324 may be performed firstly, followed by fastening the screw hole 1342 with the screw fastening apparatus 1344, such that the length of the cross rod assembly 100 may be adjusted in arbitrary. Further referring to FIG. 2, in the present embodiment, a connection protrusion 122 may be configured on a side face of the cross rod connection portion 120 connecting with the cross rod main body 110. A shape of a cross section of the connection protrusion 122 may be consistent with that of the hollow tube, and the connection protrusion 122 may be inserted into the hollow tube, resulting in an interference fit with the cross rod main body 110, such that the cross rod main body 110 may be fixed with the cross rod connection portion 120. In other embodiments, a connection hole may be defined on the side face of the cross rod connection portion 120 connecting with the cross rod main body 110. A shape of a cross section of the connection hole may be consistent with that of the hollow tube, and the hollow tube may be inserted into the connection hole, resulting in an interference fit with the cross rod connection portion 120, such that the cross rod main body 110 may be fixed on the cross rod connection portion 120.

Further referring to FIG. 2, between the cross rod connection portion 120 and the longitudinal rod 200, one of them may define a mounting hole, and the other one may have a mounting protrusion. The cross rod connection portion 120 and the longitudinal rod 200 may connect with each other through the mounting hole and the mounting protrusion in a detachable manner. That is, when the mounting protrusion is configured on the longitudinal rod 200, the cross rod connection portion 120 may define a mounting hole correspondingly; and when the mounting protrusion is configured on the cross rod connection portion 120, the longitudinal rod 200 may define a mounting hole correspondingly. In the present embodiment, the mounting protrusion 124 may be configured on the cross rod connection portion 120, and the longitudinal rod 200 may define a mounting hole 224 correspondingly. The mounting protrusion 124 may be inserted into the mounting hole 224 to achieve an engagement between the mounting hole 224 and the mounting protrusion 124, such that the cross rod assembly 100 may be fixed with the longitudinal rod 200.

Figure 4:
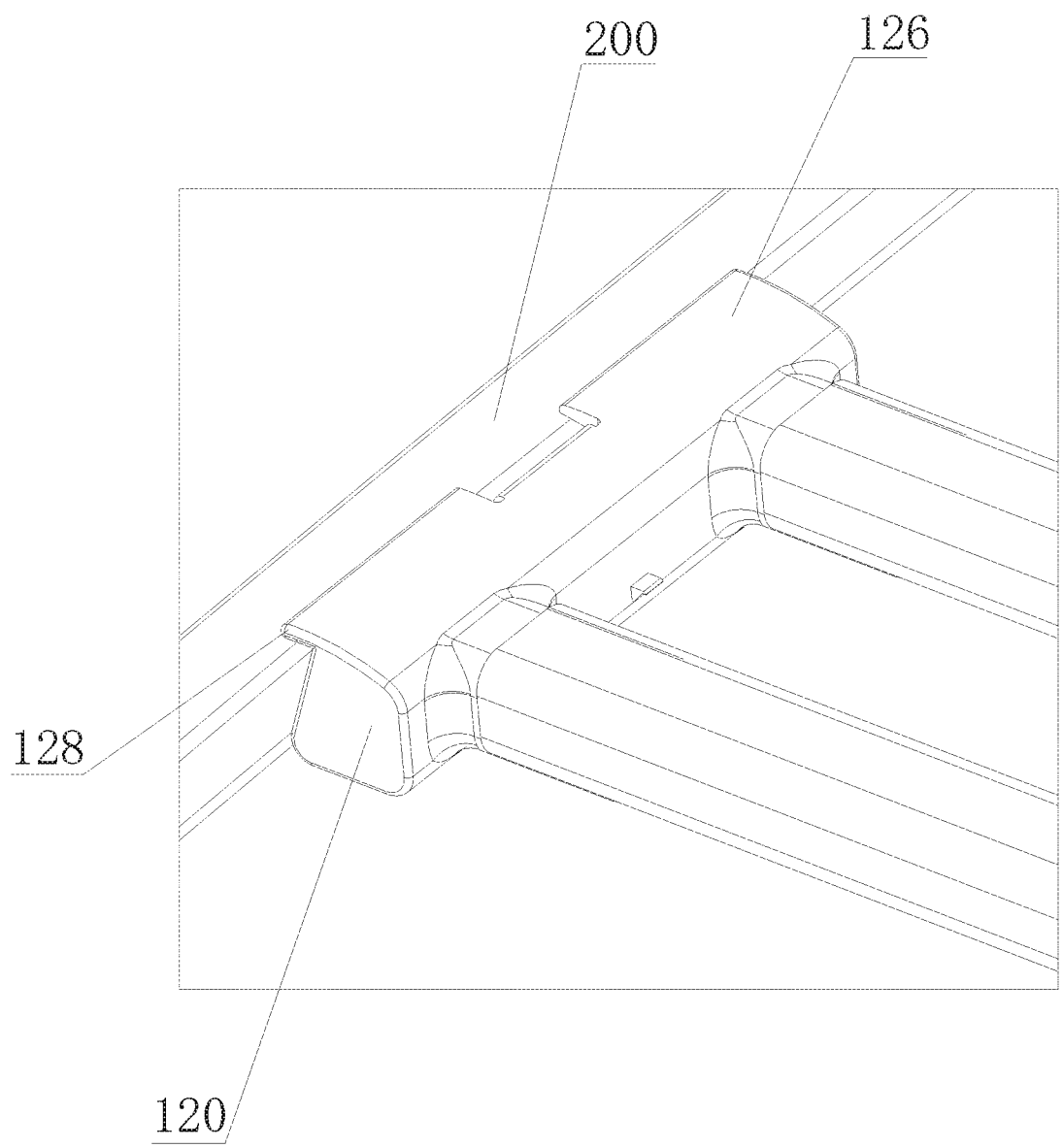
FIG. 4 is a diagram showing a portion of engagement between the cross rod assembly and the longitudinal rod.

Further referring to FIG. 2 and FIG. 4, FIG. 4 is a diagram showing a portion of engagement between the cross rod assembly and the longitudinal rod.

A top face of the cross rod connection portion 120, may extend towards the longitudinal rod 200, forming a first extension portion 128, wherein the first extension portion 128 may overlie the longitudinal rod 200. The top face 126 may be a face contacting articles during carriage. After the engagement between the mounting hole 224 and the mounting protrusion 124, the overlying of the first extension portion 128 on the longitudinal rod 200 may be achieved. Configuration of the first extension portion 128 may be to improve carrying capacity of the cross rod of the roof luggage rack. Without the first extension portion 128, the supporting force of the cross rod assembly 100 may be provided by the engagement of the mounting protrusion 124 with the mounting hole 224 only. When carrying articles, all the weight may be loaded to the mounting protrusion 124, which may damage the mounting protrusion 124. With the configuration of the first extension portion 128, a surface contact between the first extension portion 128 and the longitudinal rod 200 may allow most of the weight of the articles to be loaded to the longitudinal rod 200, such that the mounting protrusion 124 may function for positioning only, further improving carrying capacity of the roof luggage rack.

As the first extension portion 128 may be used to bear vertical forces only, to further prevent the cross rod assembly 100 from moving horizontally to damage the mounting protrusion 124, the locking buckle 300 may be arranged to fix the longitudinal rod 200 with the cross rod assembly 100 in a detachable manner.

Figure 5:
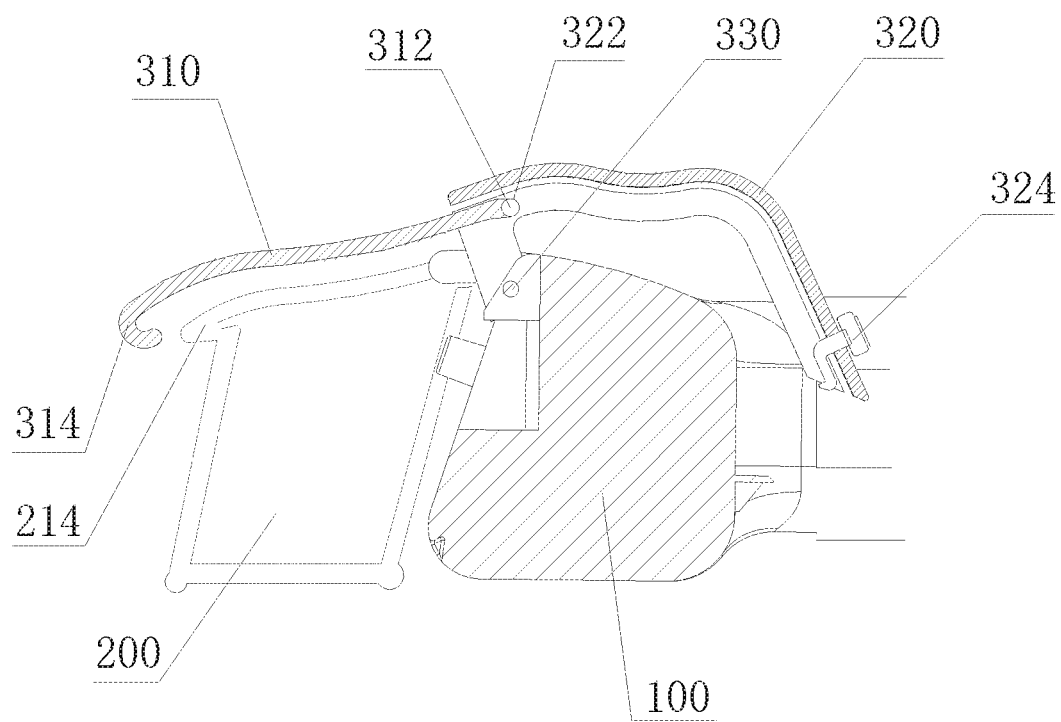
FIG. 5 is a diagram showing a status of the locking buckle buckling the longitudinal rod with the cross rod assembly according to FIG. 1.
Figure 6:
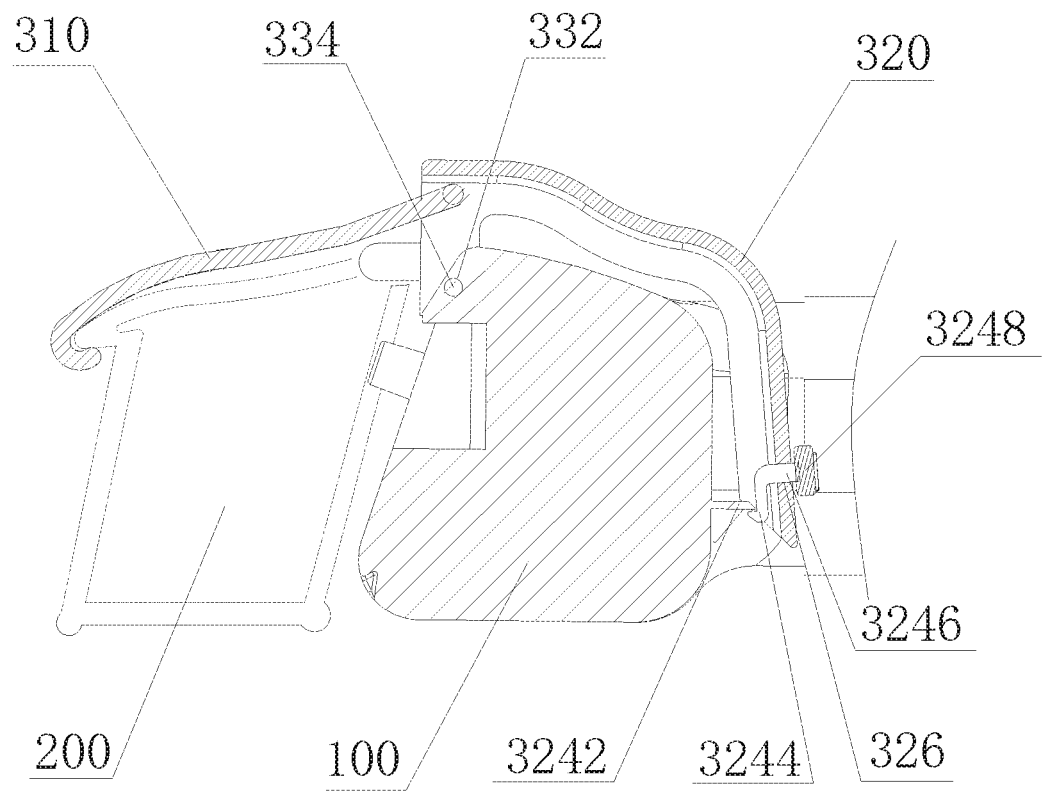
FIG. 6 is a perspective view of the longitudinal rod buckling with the cross rod assembly through the locking buckle.

Referring to FIG. 5 and FIG. 6, FIG. 5 is a diagram showing a status of the locking buckle buckling the longitudinal rod with the cross rod assembly according to FIG. 1, and FIG. 6 is a perspective view of the longitudinal rod buckling with the cross rod assembly through the locking buckle.

The locking buckle 300 may include a buckle arm 310 and a buckle handle 320 which pivotally connect with each other, wherein an end of the buckle arm 310, which is remote from the buckle handle 320, may buckle with the longitudinal rod 200 in a detachable manner, and an end of the buckle handle 320, which is remote from the buckle arm 310, may further buckle with the cross rod connection portion 120 in a detachable manner. The buckle arm 310 and the buckle handle 320 may be pivotally connected, and two unconnected ends may extend towards two side. That is the non-pivotally-connected end of the buckle arm 310 may buckle with the longitudinal rod 200, and the non-pivotally-connected end of the buckle handle 320 may buckle with the cross rod assembly 100, such that the locking buckle 300 may fixedly connect the longitudinal rod 200 with the cross rod assembly 100 in a detachable manner. Based on structures of the buckling, there may be various modes of the buckling. To be specific, the buckling structure may be formed by a hook and a stationary shaft, by two hooks, or by a buckle and a fixing terminal or the like.

Further, the pivot connection between the buckle arm 310 and the buckle handle 320 may include either one of the buckle arm 310 and the buckle handle 320 being configured with a first pivot, and the other one of the buckle arm 310 and the buckle handle 320 defining a first pivot hole to receive the first pivot. Engagement of the first pivot with the first pivot hole may achieve the pivot connection between the buckle arm 310 and the buckle handle 320. That is, when the buckle arm 310 is configured with the first pivot, the buckle handle 320 may define the first pivot hole to receive the first pivot; alternatively, when the buckle handle 320 is configured with the first pivot, the buckle arm 310 may define the first pivot hole to receive the first pivot. In the present embodiment, the buckle arm 310 may be configured with the first pivot 312, and the buckle handle 320 may define the first pivot hole 322, such that the buckle arm 310 and the buckle handle 320 may be pivotally connected. The buckle arm 310 and the buckle handle 320 may also be connected in other movable manners, such that the buckle arm 310 and the buckle handle 320 may rotate in relative to each other, such as a hinge connection or the like, which are also included in the scope of the present disclosure and will not be described herein.

Further, an end of the buckle handle 320 close to the buckle arm 310 may further pivotally connect with the cross rod assembly 100. To be specific, between the end of the buckle handle 320 close to the buckle arm 310 and the cross rod assembly 100, either one of which may be configured with a second pivot, and the other one of which may define a second pivot hole to receive the second pivot. Engagement of the second pivot and the second pivot hole may achieve the pivot connection between the locking buckle 300 and the cross rod assembly 100. That is, when the buckle handle 320 is configured with a second pivot, the cross rod assembly 100 may define a second pivot hole to receive the second pivot; alternatively, when the cross rod assembly is configured with the second pivot, the buckle handle 320 may define the second pivot hole to receive the second pivot. In the present embodiment, the cross rod assembly 100 may be configured with the second pivot 334, and the end of the buckle handle close to the buckle arm 310 may define the second pivot hole 332 to receive the second pivot, such that the cross rod assembly 100 and the buckle handle 320 may be pivotally connected. The cross rod assembly 100 and the buckle handle 320 may also be connected in other movable manners, such that the buckle handle 320 may rotate on the cross rod assembly 100, such as a hinge connection or the like, which are also included in the scope of the present disclosure and will not be described herein.

Further, an end of the buckle arm 310 remote from the buckle handle 320 may bend towards the longitudinal rod 200 to form a bending portion 314. A top face of the longitudinal rod 200, which contacts the buckle arm 310, may extend outwards to the bending portion 314 to form a second extension portion 214. The bending portion 314 may buckle with the second extension portion 214 to achieve the buckling connection between the locking buckle 300 and the longitudinal rod 200.

Further, the buckle handle 320 may include a buckle switch 324, which may be configured at an end of the buckle handle 320 remote from the buckle arm 310. The buckle handle 320 may be connected with the cross rod assembly 100 in a detachable manner through the buckle switch 324.

Figure 7:
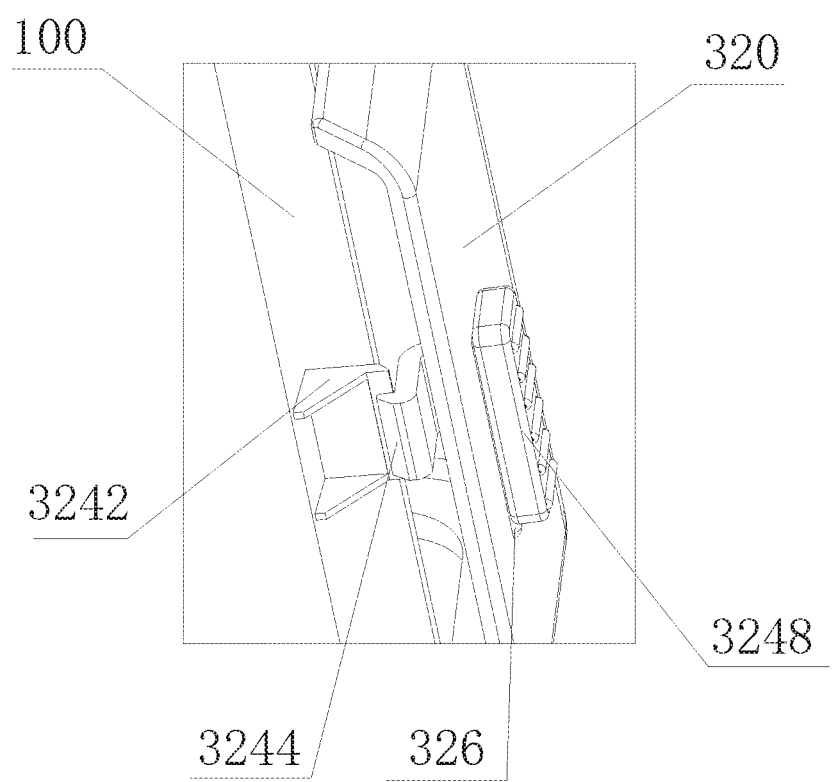
FIG. 7 is a perspective view of a buckle switch buckling the cross rod assemblies.

Referring to FIG. 7 continually with FIG. 5 and FIG. 6, FIG. 7 a perspective view of a buckle switch buckling the cross rod assemblies.

The buckle switch 324 may be configured at an end of the buckle handle 320 remote from the buckle arm 310. The end of the buckle handle 320 remote from the buckle arm 310 may define a connection hole 326, and the cross rod assembly 100 may be configured with a first buckling portion 3242. The buckle switch 324 may include a second buckling portion 3244, a connection portion 3246, and an abutting portion 3248. A size of the connection hole 326 may be slightly smaller than that of the abutting portion 3248, but larger than that of the connection portion 3246 and the second buckling portion 3244. The abutting portion 3248 may be configured at the outside of the connection hole 326, covering a part of the connection hole 326, and the connection portion 3246 may pass through the connection hole 326 to allow the second buckling portion 3244 to connect with the abutting portion 3248. That is, the second buckling portion 3244 and the abutting portion 3248 may be configured at two sides of the buckle handle 320 respectively, and the second buckling portion 3244 may buckle with the first buckling portion 3242, such that the buckle handle 320 may buckle with the cross rod assembly 100. When the abutting portion 3248 slides to an uncovered part of the connection hole 326, the second buckling portion 3244 and the first buckling portion 3242 may be detached to release the buckle handle 320.

A side of the second buckling portion 3244 remote from the connection portion 3246 may bend towards the cross rod assembly 100 and extend towards the first buckling portion 3242. A face of the second buckling portion 3244 close to the first buckling portion 3242 may be a plane, and a face adjacent to the plane may be a ramp. In the present embodiment, the second buckling portion 3244 may be made of materials with certain elasticity or plasticity, wherein the elastic or plastic material may be slightly deformation when bearing external forces. When the buckle handle 320 rotates to reach the position of where the first buckling portion 3242 is located, the buckle handle 320 may be pressed inwards. The configuration of the ramp is to lead the second buckling portion 3244 to slide downwards when the second buckling portion 3244 on the buckle switch 324 is deformed by external forces. When an end of the ramp slides to reach a bottom surface of the first buckling portion 3242, forces for deformation may be removed, the second buckling portion 3244 may be restored to an original state, the first buckling portion 3242 may hook the plane of the second buckling portion 3244, such that the second buckling portion 3244 may buckle with the first buckling portion 3242 to connect the buckle handle 320 and the cross rod assembly 100.

When the locking buckle 300 is required to be released, the abutting portion 3248 may slide to another side of the connection hole 326, driving the connection portion 3246 and the second buckling portion 3244 to move to a same direction. As the first buckling portion 3242 of the cross rod assembly 100 is fixedly positioned, the second buckling portion 3244 may slide to detach from the first buckling portion 3242, and the buckle handle 320 may be released.

Figure 8:
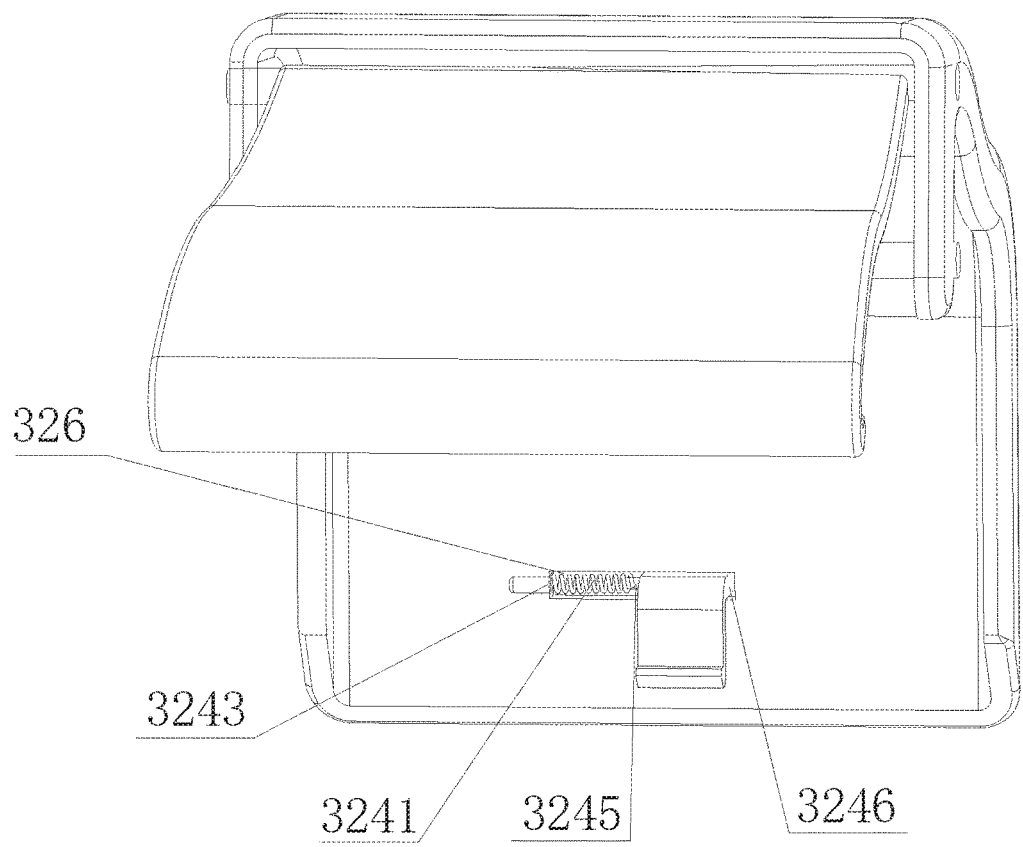
FIG. 8 is a perspective view of the locking buckle.

Referring to FIG. 8 continually with FIG. 6, FIG. 8 is a perspective view of the locking buckle.

The buckle switch 324 may further include a reset element 3241, configured between a side wall of the connection hole 326 and the connection portion 3246 to reset the abutting portion 3248 after releasing the second buckling portion 3244 from the first buckling portion 3242. The reset element 3241 may be an element capable of extending and retracting, that is, when external forces are applied, the reset element may be shortened, and when the external forces relieved, the reset element may be reset to the original length. The side wall of the connection hole 326 may define a receiving hole 3243 remote from the connection portion 3246, a side of the connection portion 3246 close to the receiving hole 3243 may be configured with a protrusion 3245. An end of the reset element 3241 may be inserted into the receiving hole 3243, and the other end coil with the protrusion 3245 to fix the rest element 3241. At this stage, the reset 3241 may be slightly deformed to generate a deforming force to press the connection portion 3246 to an end of the connection hole 326. When the first buckling portion 3242 buckles with the second buckling portion 3244, the reset element 3241 may apply an elastic force to press the second buckling portion 3244 tightly, such that the first buckling portion 3242 and the second buckling portion 3244 may not be detached due to looseness of the second buckling portion 3244. When the abutting portion 3248 slides to detach the first buckling portion 3242 from the second buckling portion 3244, the reset element 3241 may reset the second buckling portion 3244, such that the first buckling portion 3242 may buckle with the second buckling portion 3244 when using for a next time. In the present embodiment, the reset element 3241 may be a spring, and the advantages of using the spring is that a spring may be easily replaced as a commonly used elastic element.

By configuring the first extension portion on the top face of the cross rod connection portion, when the cross rod assembly abuts the longitudinal rod, the first extension portion may overlie on the longitudinal rod, the first extension portion may overlie on the longitudinal rod to improve carrying capacity of the roof luggage rack. Further, by configuring a locking buckle, the cross rod assembly may be further fixed onto the longitudinal rod and prevented from sliding, which stabilize the structure of the roof luggage rack.

Figure 9:
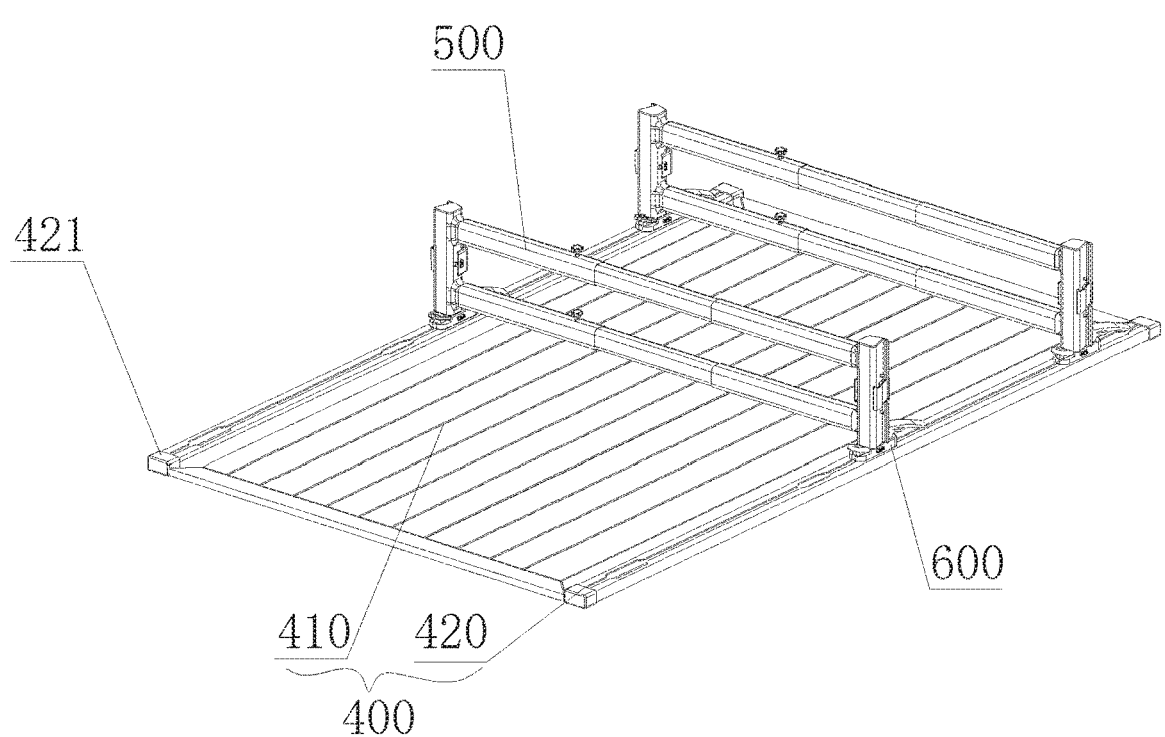
FIG. 9 is a perspective view of an article separation device according to another embodiment of the present disclosure.
Figure 10:
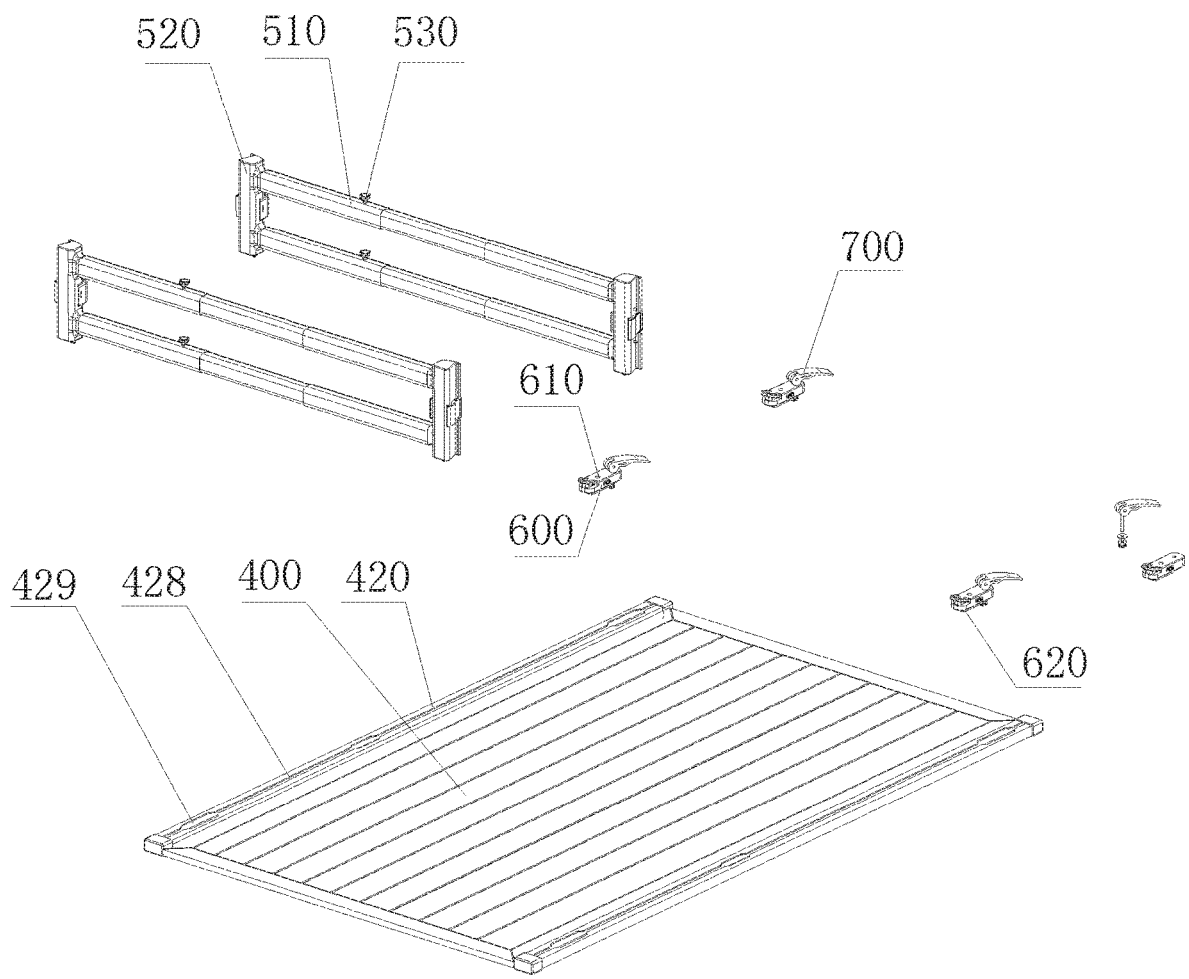
FIG. 10 is an exploded perspective view of the article separation device according to FIG. 9.

Referring to FIG. 9 and FIG. 10, FIG. 9 is a perspective view of an article separation device according to another embodiment of the present disclosure, and FIG. 10 is an exploded perspective view of the article separation device according to FIG. 9.

When the device is used to separate articles, it may include a bottom board 400 to carry articles; at least two cross rod assemblies 500, configured on the bottom board to separate the articles on the bottom board 400; a connection element 600, connecting the cross rod assemblies 500 with the bottom board 400 in a detachable manner, wherein the connection element 600 may slide on the bottom board 400 to adjust distance between two adjacent cross rod assemblies 500 based on the article sizes; and a locking switch 700, configured on the connection element 600 to lock the connection element 600 onto the bottom board 400 after the cross rod assemblies 500 are adjusted properly.

The article separation device may be used wherever the articles need to be separated. When placing the article separation device in a trunk of a vehicle, the bottom board 400 may be a bottom face of the vehicle trunk. Alternatively, based on a size of the vehicle trunk, an independent board may be designed to place into the vehicle trunk, wherein the board may be made of any material, such as metal alloys, plastics, woods, or the like. The independent board may prevent articles with excessive weight from hurting the vehicle.

Further, the bottom board 400 may include a bottom board main body 410 and slide rails 420 arranged on at least two opposite sides of the bottom board main body 410, wherein the bottom board main body 410 may be used to carry articles. Two opposite sides of a connection element 600 may connect with a cross rod assembly 500 and a slide rail 420, respectively, and the connection element 600 may slide along the slide rail 420. The cross rod assembly 500 may include a cross rod main body 510, a cross rod connection portion 520, and a fixing portion 530, wherein the cross rod main body 510 may include at least two hollow tubes. The at least two hollow tubes may sleeve-connect to extend and retract in arbitrary, the fixing portion 530 may be configured to fix the at least two hollow tubes, and the cross rod connection portion 520 may be configured at two ends of the cross rod main body 510 and connect with the connection element 600 in a detachable manner.

The at least two opposite sides of the bottom board main body 410, which may be for configuration of the slide rails 420, may include two opposite sides along a length direction of the bottom board main body 410, two opposite sides along a width direction of the bottom board main body 410, or both of the two opposite sides along the length direction and the two opposite sides along the width direction of the bottom board main body 410. In the present embodiment, there may be two slide rails 420, configured on two opposite sides along the length direction of the bottom board main body 410. The connection elements 600 and the slide rails 420 may connect with the cross rod assemblies 500 to drive the cross rod assemblies 500 to slide along the length direction of the slide rails 420, such that distance between two adjacent cross rod assemblies 500 may be adjusted according to sizes of the carried articles. In the present embodiment, a part of the structure of the cross rod assemblies 500 may be the same as a part of that of the cross rod assemblies 200 when being used as the roof luggage rack as described in the above, which will not be repeatedly described herein. The present embodiment is to describe the other part of the structure of the cross rod assemblies 500 which may be different from that of the cross rod assemblies 200 in the above embodiments.

Figure 11:
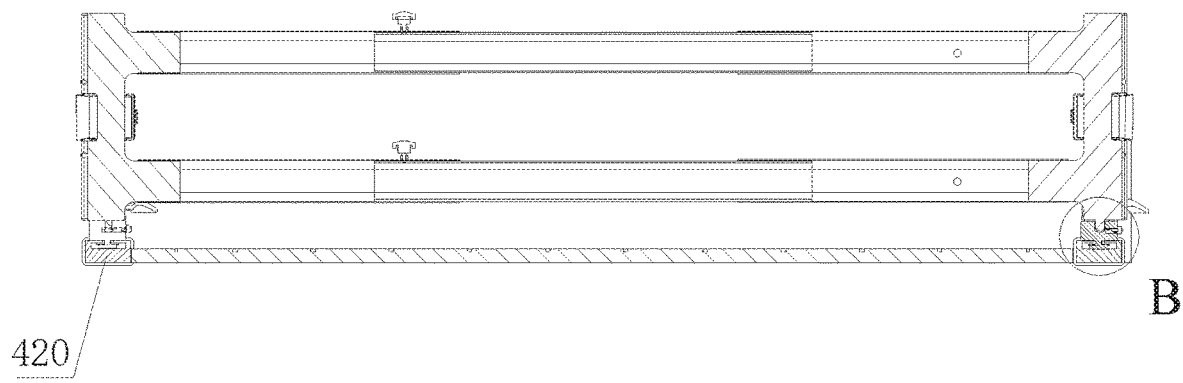
FIG. 11 is a cross section view of the article separation device according to FIG. 9.
Figure 12:
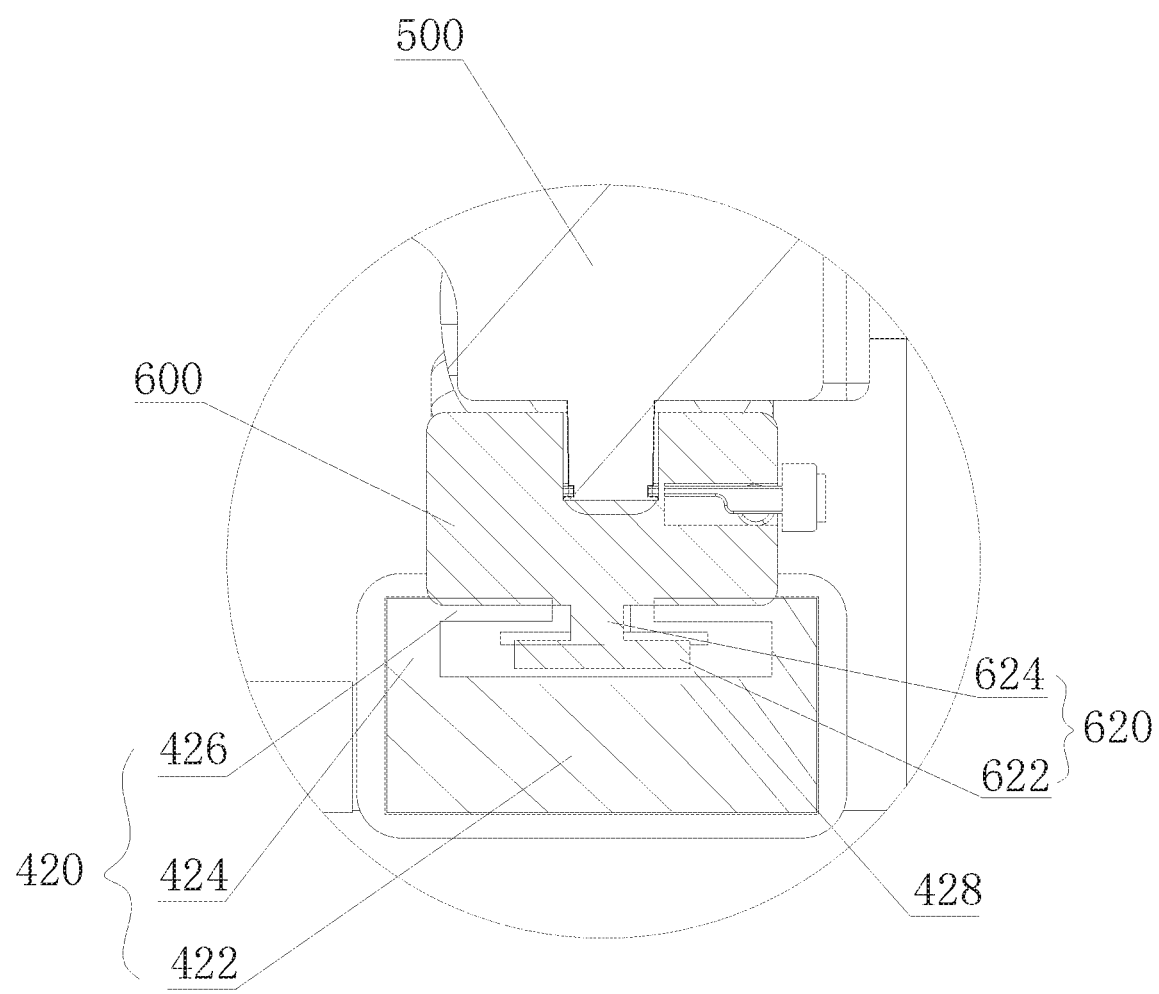
FIG. 12 is an enlarged view of the portion in the circle B of FIG. 11.

Referring to FIG. 11 and FIG. 12 continually with FIG. 9, FIG. 11 is a cross section view of the article separation device according to FIG. 9, and FIG. 12 is an enlarged view of the portion in the circle B of FIG. 11.

A side face of the connection element 600 close to the slide rail 420 may be configured with a slide block 620, and the slide rail 420 may be configured with a receiving groove 428 along a length direction of the slide rail 420, wherein the slide block 620 may slide along the receiving groove 428, which is along the length direction of the slide rail 420.

The slide rail 420 may further include a slide rail main body 422, a slide rail side wall 424, and a slide rail extension portion 426. There may be two of the slide rail side walls 424 and two of the slide rail extension portions 426. The two slide rail side walls 424 may be configured at two opposite sides of the slide rail main body 422, and each of the two slide rail extension portions 426 may extend from an end of the slide rail side wall 424 towards the opposite side to form the receiving groove 428, wherein the end of the slide rail side wall 424 is remote from the slide rail main body 422. The slide block 620 may include a slide block main body 622 received in the receiving groove 428 and a slide extension portion 624, which extends from the slide block main body 622 to the outside of the receiving groove 428 to connect with the connection element 600. A size of the slide block main body 622 may be larger than the distance between the two slide rail extension portions 426 and small than the distance between the two slide rail side walls 424. A size of the slide extension potion 624 may be smaller than the distance between the two slide rail extension portions 426.

As one aspect, engagement between the slide block 620 and the receiving groove 428 may fix the cross rod assembly 500 onto the slide rail 420 in a flexible manner, allowing the cross rod assembly 500 to slide along the length direction of the slide rail 420. As another aspect, the engagement between the slide block 620 and the receiving groove 428 may prevent the slide block main body 622 from falling off from the slide rail 420, which may impact efficiency of setting up the device. Further, protection caps 421 may be configured at two ends of the slide rail 420, wherein the protection caps 421 may completely encase two openings at the two ends of the slide rail 420, such that the connection element 600 may be prevented from falling off, and interior of the vehicle and the articles may be protected from being scratched by the two ends of the slide rail 420.

Figure 13:
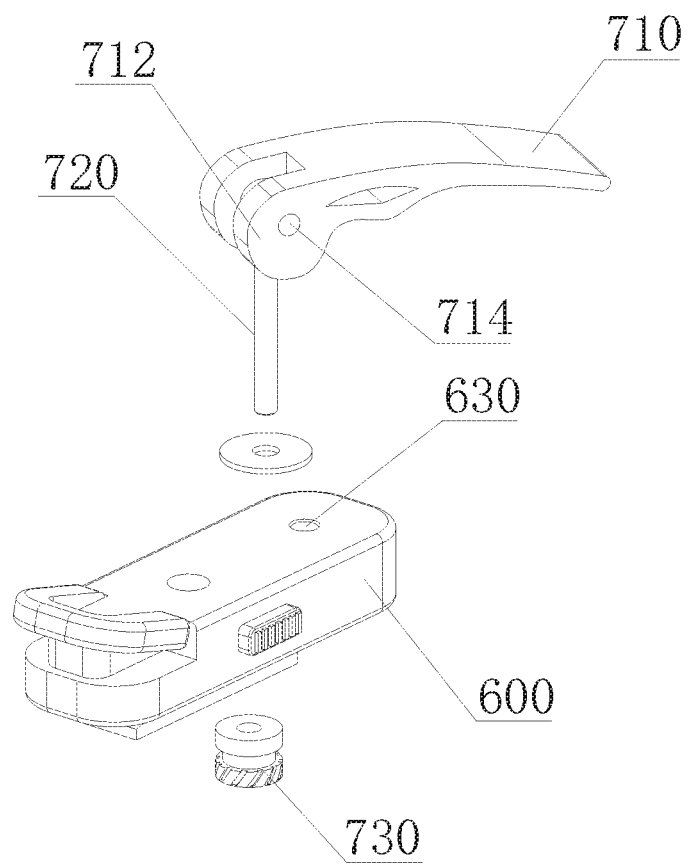
FIG. 13 is a perspective view of the connection element and the locking switch.
Figure 14:
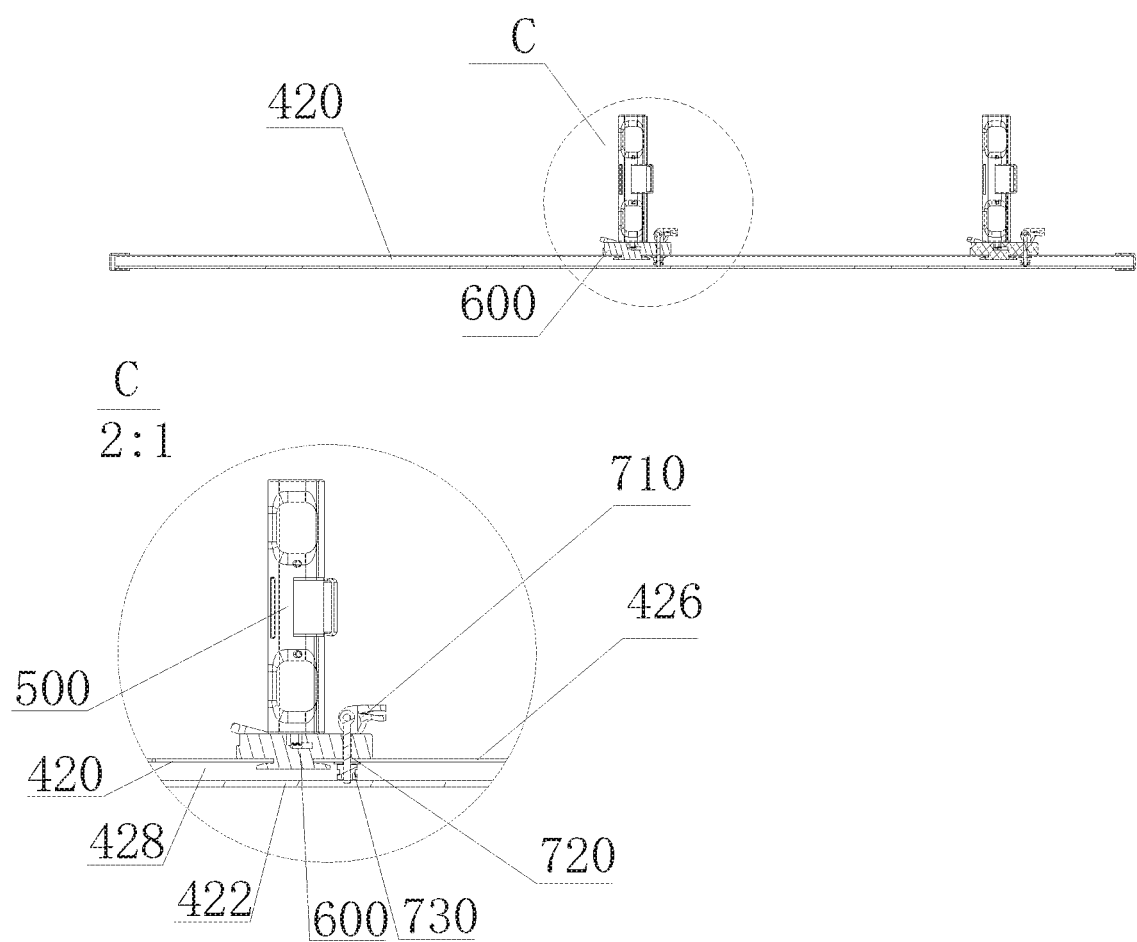
FIG. 14 is a cross section view of another article separation device according to another embodiment of the present disclosure.

Referring to FIG. 13 and FIG. 14, continued from FIG. 10, FIG. 13 is a perspective view of the connection element and the locking switch, and FIG. 14 is a cross section view of another article separation device according to another embodiment of the present disclosure.

When the cross rod assembly 500 is used to separate articles carried on the bottom board 400, the cross rod assembly 500 may need to be fixed to clamp the articles tightly, such that the articles may not be moved. Therefore, after the distance between articles is adjusted properly based on sizes of the articles, a locking switch 700 may be configured to fix the position of the cross rod assembly 500 in relative to the bottom board 400 through the connection element 600.

The connection element 600 may define a through hole 630, and the locking switch 700 may include a switch handle 710, a screw rod 720, and a nut 730. The nut 730 may be arranged within the receiving groove 428, between the slide rail main body 422 and the slide rail extension portion 426. The screw rod 720 may extend through the through hole 630, join with the switch handle 710 on a side facing the cross rod assembly 500 by hinging and detachably connect with the nut 730 on a side facing the bottom board 400 inside the slide rail 420. The handle 710 may be configured to control the nut 730 to move towards the slide rail main body 422 or the slide rail extension portion 426, such that the connection element 600 may be tightly locked with or unlocked from the slide rail extension portion 426.

Further, the switch handle 710 may include a cam 712 at an end of where the switch handle 710 contacts the connection element 600. A central shaft 714 may be provided with the cam 712, and the screw rod 720 may be formed by extending from a center of the central shaft 714. Distance between the central shaft 714 and edges of the cam 712 may be gradually changed.

To be specific, when the position of the cross rod assembly 500 is required to be adjusted, the switch handle 710 may be lifted towards the cross rod assembly 500. As a radius of the cam 712 may be gradually reduced, distance between the central shaft 714 and a contact surface of the connection element 600 may be reduced accordingly, such that the screw rod 720, may be lowered down, and the cam 730 may be moved towards the slide rail main body 422, released from the slide rail extension portion 426. In such a way, movement of the cross rod assembly 500 may be achieved via the connection element 600. When the cross rod assembly 500 is adjusted to an appropriate position, the handle 710 may be rotated towards the bottom board 400. As the radius of the cam 712 is gradually increased, the distance between the central shaft 714 and the contact surface of the connection element 600 may be increased accordingly, resulting in the screw rod 720, moving upwards, driving the nut 730 to move towards the slide rail extension portion 426 to tightly compress the slide rail extension portion 426. Due to friction, the connection element 600 may be fixed with the slide rail 420, such that the cross rod assembly 500 may be fixed onto the bottom board 400 at an appropriate position.

Further referring to FIG. 10, in order to place the slide block main body 622 within the receiving groove 428, mounting grooves 429 may be defined with distance apart. Width of an opening of a mounting groove 429 may be greater than that of the slide block main body 622 (as shown in FIG. 12). This enables the slide block 620 to be placed into the slide rail 420 through the mounting groove 429.

Figure 15:
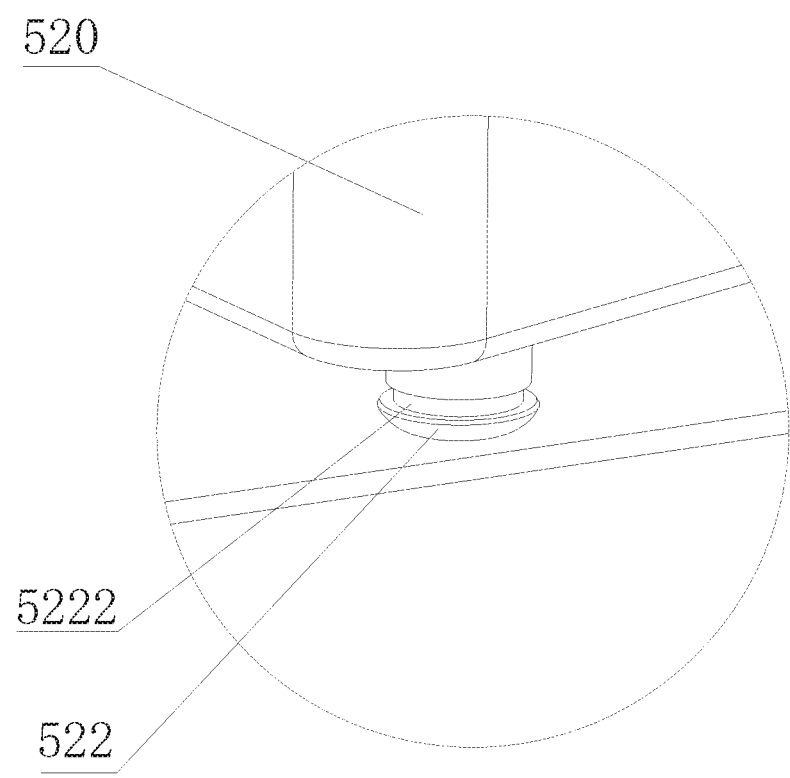
FIG. 15 is an enlarged view of a portion of the connection portion of the cross rod.
Figure 16:
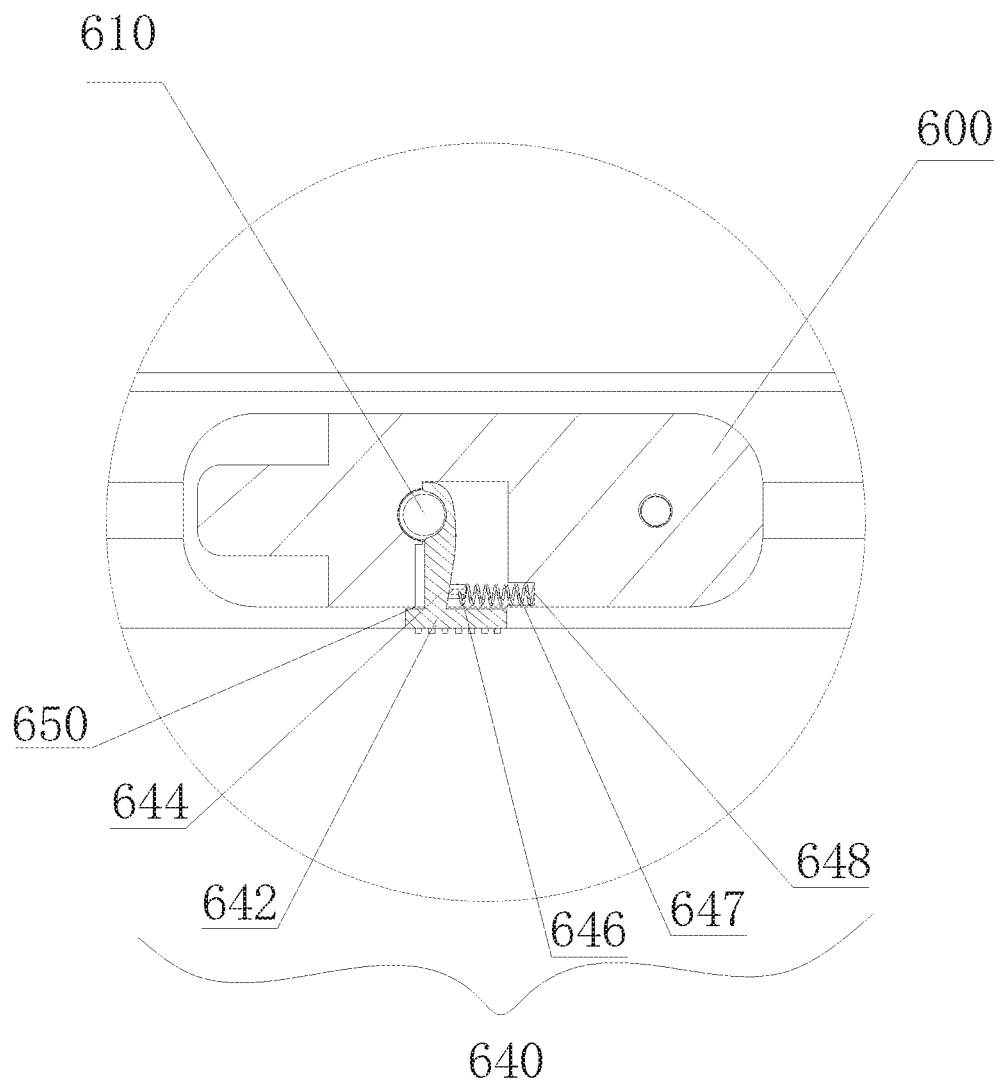
FIG. 16 is a cross section view of a portion of the connection element.

Referring to FIG. 15 and FIG. 16, continually with FIG. 10, FIG. 15 is an enlarged view of a portion of the connection portion of the cross rod, and FIG. 16 is a cross section view of a portion of the connection element.

The connection element 600 may define a mounting hole 610 on a side facing the cross rod connection portion 520, and the cross rod connection portion 520 may be configured with a mounting cam 522 on a side facing the connection element 600. The connection element 600 and the cross rod connection portion 520 may be connected through the mounting hole 610 and the mounting cam 522 in a detachable manner. Further, a pulling prevention groove 5222 may be defined close to an end of the mounting cam 522.

The connection element 600 may include a pin switch 640, which may automatically lock the mounting cam 522 when the mounting cam 522 is placed into the mounting hole 610, and release the mounting cam 522 when the cross rod connection portion 520 is extracted.

To be specific, the pin switch 640 may include a switch main body 642, a switch extension portion 644, a protruded shaft 646, a spring 647, and a spring hole 648. An opening 650 (not shown in the figure) may also be defined on the connection element 600. The switch main body 642 may be positioned outside the connection element 600, and the switch extension portion 644 may be positioned inside the opening 650 and connect with the switch main body 642. The switch main body 642 positioned outside the connection element 600 may be toggled to control movement of the switch extension portion 644 positioned inside the opening 650.

Further, the switch extension portion 644 may define an arced notch at which the switch extension portion 644 contacts the mounting cam 522, and may be configured with a protruded shaft 646 on a side opposite to the mounting cam 522. A side wall of the opening 650, which is defined opposite to the protruded shaft 646, may define a spring hole 648. An end of the spring 647 may coil onto the protruded shaft 646, and the other end of the spring 647 may be arranged within the spring hole 648. When the mounting cam 522 is placed into the mounting hole 610, the mounting cam 522 may be moved downwards to push the switch extension portion 644 away from the mounting cam 522. When the mounting cam 522 moves downwards to reach a certain position, the pulling prevention groove 5222 may contact the switch extension portion 644. As a radius of the pulling prevention groove 5222 is smaller than that of the end of the mounting cam 522, the switch extension portion 644 may tightly compress the mounting cam 522 under the force provided by the spring 647, such that the cross rod connection portion 520 may be prevented from being pulled out of the mounting hole 610.

When the cross rod connection portion 520 is required to be released, the switch main body 642 may be toggled to a reversed direction against the spring 647. Under the force provided by the spring 647, an end of the switch extension portion 644 remote from the switch main body 642 may move away from the mounting cam 522 to leave the pulling prevention groove 5222. When the cross rod connection portion 520 is pulled out, the switch extension portion 644 may not prevent the pulling, such that the cross rod connection portion 520 may be pulled out of the mounting hole 610 smoothly.

According to the above article separation device, by configuring the bottom board, the cross rod assembly, the connection element, and the locking switch, the cross rod assembly 500 may be fixed onto the bottom board 400 through the connection element 600 and the locking switch 700, such that continual adjustment and separation of article positions based on sizes of the articles may be achieved. Further, as the length of the cross rod assembly 500 may be adjustable, the article separation device may be suitable for various scenarios and vehicle modes, which may broaden applications of the article separation device.

The above-mentioned embodiment, which uses the device to separate articles, may solve the problem of the roof luggage rack with single purpose of use. Referring to all the embodiments of the present disclosure, the present disclosure may provide a device to be used as roof luggage rack to carry articles and to separate articles when placing in a vehicle trunk, which may solve the problem of the roof luggage rack with single purpose of use.

The above embodiments may be for the purposes of illustrating technical solutions of the present disclosure only, but not to limit the present disclosure. Although the present disclosure may be described in details by referring to the above embodiments, ordinary skilled in the art should understand that the above described technical solutions may be modified, and a part of the features may be replaced with equivalence. Such modifications and replacement do not cause the nature of the solutions to depart from the spirit and scope of the embodiments of the present disclosure.

What is claimed is:

1. An article separation device, comprising:
    a bottom board, configured to carry articles;
    at least two cross rod assemblies, configured on the bottom board to separate articles on the bottom board, wherein the cross rod assembly comprises a cross rod main body, a plurality of cross rod connection portions, and a fixing portion, the cross rod main body comprises at least two hollow tubes, the at least two hollow tubes being sleeve-connected and being extracted and retracted flexibly, the fixing portion being configured to fix the at least two hollow tubes, and each of the plurality of the cross rod connection portions is configured at each end of the cross rod main body, and;
    a connection element, configured to connect the cross rod assembly and the bottom board in a detachable manner, the connection element capable of sliding on the bottom board to adjust distance between two adjacent cross rod assemblies based on sizes of the carried articles; and
    a locking switch, configured on the connection element to lock the connection element tightly onto the bottom board after the cross rod assemblies are adjusted to proper positions.

2. The article separation device according to claim 1, wherein
    the bottom board comprises a bottom board main body and at least two slide rails arranged on opposite sides of the bottom board, the bottom board being configured to carry the articles;
    two opposite sides of the connection element connect with the cross rod assembly and the slide rail, respectively, the connection element capable of sliding along the slide rail;
    each of the plurality of the cross rod connection portions is connected with the connection element in a detachable manner.

3. The article separation device according to claim 2, wherein a side of the connection element close to the slide rail is configured with a slide block, and the slide rail defines a receiving groove along a length direction of the slide rail, the slide block capable of sliding along the receiving groove.

4. The article separation device according to claim 3, wherein
    the slide rail comprises a slide rail main body, two slide rail side walls and two slide rail extension portions, the two slide rail side walls being disposed on two opposite sides of the slide rail main body respectively, and each of the two slide rail extension portions extending from an end of the slide rail side wall remote from the slide rail main body towards an opposite side, forming the receiving groove; and
    the slide block comprises a slide block main body received in the receiving groove and a slide block extension portion extending from the slide block main body towards an outer side of the receiving groove, a size of the slide block main body being greater than distance between the two slide rail extension portions, and a size of the slide block extension portion being smaller than the distance between the two slide rail extension portions.

5. The article separation device according to claim 4, wherein the connection element defines a through hole, and the locking switch comprises a switch handle, a screw rod, and a nut, the nut being configured within the receiving groove, between the slide rail main body and the slide rail extension portion; and
    the screw rod is configured to pass through the through hole, hingedly connected with the switch handle on a side facing the cross rod assembly, and connected with the nut on a side facing the bottom board in a detachable manner, the nut being controlled to move towards or away from the slide rail extension portion by the switch handle, such that the connection element being controlled to be locked tightly to or unlocked from the slide rail extension portion.

6. The article separation device according to claim 4, wherein the slide rail extension portion defines a plurality of mounting grooves with distance apart from each other, an opening of each mounting groove being larger than a width of the slide block main body, such that the slide block main body being placed into the slide rail through the mounting groove.

7. The article separation device according to claim 2, wherein a side of the connection element facing the cross rod connection portion defines a mounting hole, and a side of the cross rod connection portion facing the connection element is configured with a mounting cam, the connection element and the cross rod connection portion being connected through the mounting hole and the mounting cam in a detachable manner.

8. The article separation device according to claim 7, wherein the connection element is configured with a pin switch, the pin switch automatically locking the mounting cam after the mounting cam being placed into the mounting hole, and releasing the mounting cam when the cross rod connection portion being pulled out of the mounting hole.

* * * * *